United States Patent
Okuda

(10) Patent No.: US 8,548,315 B2
(45) Date of Patent: Oct. 1, 2013

(54) IN-VEHICLE CAMERA UNIT HAVING CAMERA BUILT INTO BODY

(75) Inventor: Syo Okuda, Nagoya (JP)

(73) Assignee: Denso Corporation, Kariya (JP)

( * ) Notice: Subject to any disclaimer, the term of this patent is extended or adjusted under 35 U.S.C. 154(b) by 110 days.

(21) Appl. No.: 13/331,339

(22) Filed: Dec. 20, 2011

(65) Prior Publication Data

US 2012/0155855 A1    Jun. 21, 2012

(30) Foreign Application Priority Data

Dec. 21, 2010   (JP) ................. 2010-284773

(51) Int. Cl.
*G03B 17/08* (2006.01)

(52) U.S. Cl.
USPC ............................ 396/25; 396/427; 396/429

(58) Field of Classification Search
USPC ........................................................ 396/25
See application file for complete search history.

(56) References Cited

U.S. PATENT DOCUMENTS

| | | | | |
|---|---|---|---|---|
| 6,799,904 | B2 * | 10/2004 | Schaefer et al. | 396/427 |
| 7,480,149 | B2 * | 1/2009 | DeWard et al. | 361/728 |
| 2003/0059218 | A1 | 3/2003 | Sakata et al. | |
| 2012/0155855 | A1 * | 6/2012 | Okuda | 396/535 |

FOREIGN PATENT DOCUMENTS

| | | |
|---|---|---|
| JP | 05-032191 | 4/1993 |
| JP | 09-024775 | 1/1997 |
| JP | 2002-341432 | 11/2002 |
| JP | 2002-374441 | 12/2002 |
| JP | 2004-075033 | 3/2004 |
| JP | 2005-192114 | 7/2005 |

OTHER PUBLICATIONS

Office Action issued Jan. 9, 2013 in corresponding Japanese Application No. 2010-284773 with English translation.

* cited by examiner

*Primary Examiner* — W B Perkey

(74) *Attorney, Agent, or Firm* — Harness, Dickey & Pierce, PLC

(57) ABSTRACT

An in-vehicle camera unit has a body to which a lens is attached and prevention members that prevent water drops from falling on the lens. Specifically the body has a top surface where the lens is arranged, a front surface of the lens being exposed to an outside of the body. The top surface has an oblique portion extending from the periphery of the lens backward of the lens. The oblique portion is oblique in such a way as to be away from the optical axis 13*a* of the lens with increasing distance from the lens backward. The prevention member is provided in or on the oblique portion across an oblique direction of the oblique portion.

12 Claims, 4 Drawing Sheets

IN-VEHICLE CAMERA UNIT HAVING CAMERA BUILT INTO BODY

CROSS-REFERENCE TO RELATED APPLICATION

This application is based on and claims the benefit of priority from earlier Japanese Patent Application No. 2010-284773 filed on Dec. 21, 2010, the description of which is incorporated herein by reference.

BACKGROUND OF THE INVENTION

1. Technical Field of the Invention

The present invention relates to an in-vehicle camera unit having a camera built into a body. In particular, the present invention is related to the structure of the body of the in-vehicle camera unit.

2. Related Art

Recent year, techniques for equipping an in-vehicle camera on board and using the images taken by the in-vehicle camera are put to practical use. There is a technique for assisting a user to drive a vehicle on the basis of images taken by in-vehicle camera as an example of such techniques (JP-U-1993-32191).

Sometimes the in-vehicle camera is attached to a windshield of the vehicle.

In a case where the windshield of the vehicle slopes forward and downward, the in-vehicle camera is positioned under the windshield. When dew condensation forms on the inside surface of the windshield, the dew drop may fall on the lens of the in-vehicle camera. Alternatively, the dew drop which has fallen on other areas may flow down other surfaces and reach the lens. In this case, the image-recognition capability may be reduced or lost.

SUMMARY

According to the present disclosure, an in-vehicle camera unit which can prevent water drops adhering to a lens is provided. According to one aspect of the present disclosure, an in-vehicle camera unit have a body to which a lens is attached, and a prevention member that prevents water drops from falling on the lens, wherein the body has a first surface where the lens is arranged, a front surface of the lens being exposed to an outside of the body, the first surface has an oblique portion extending from the periphery of the lens backward of the lens, the oblique portion being oblique in such a way as to be away from the optical axis of the lens with increasing distance from the lens backward, and the prevention member is provided in or on the oblique portion across an oblique direction of the oblique portion.

DETAILED DESCRIPTION OF THE PREFERRED EMBODIMENTS (First Embodiment)

1. The Configuration of the In-vehicle Camera Unit

Figure 1:
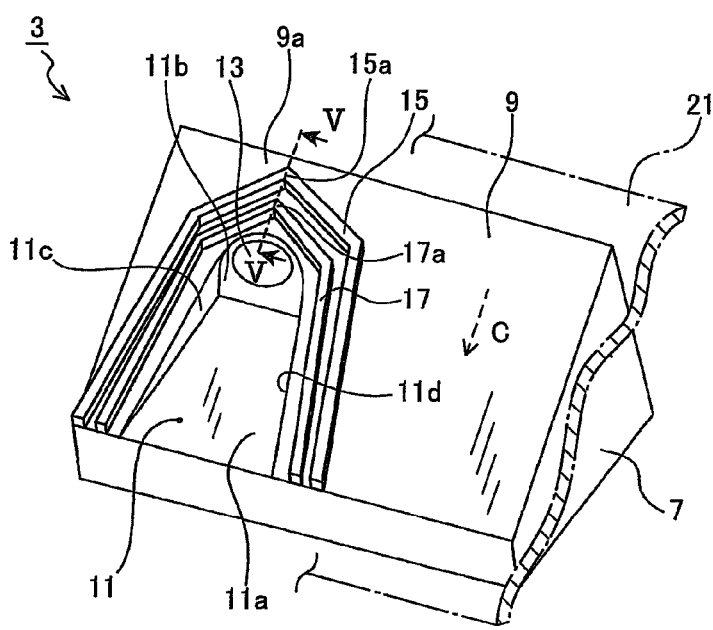
FIG. 1 is a perspective view of a main portion of an in-vehicle camera unit according to a first embodiment.
Figure 2:
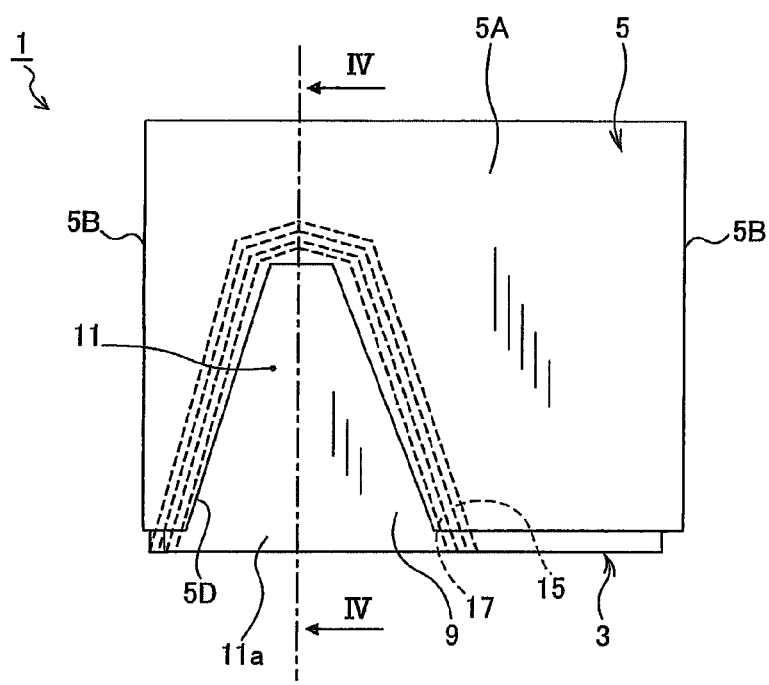
FIG. 2 is a top view of the in-vehicle camera unit according to the first embodiment of the present invention.
Figure 3:
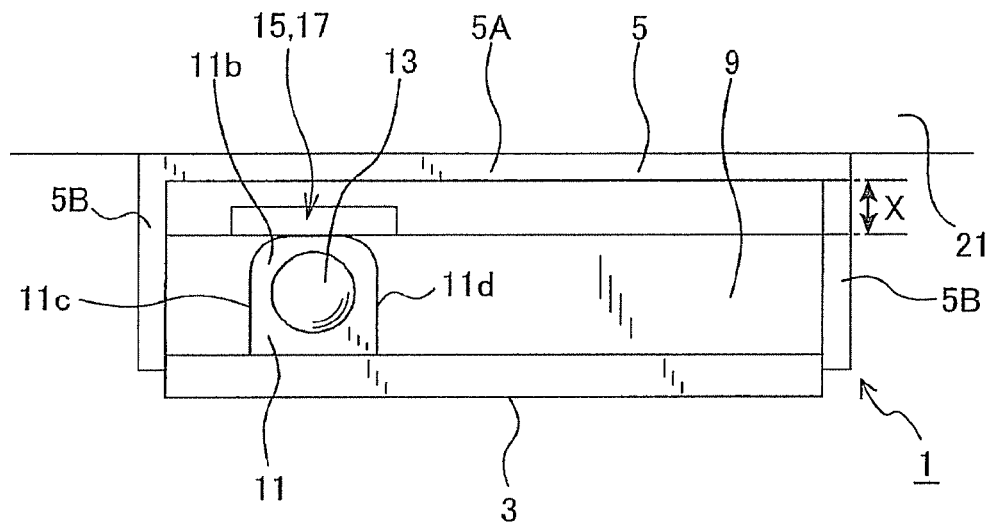
FIG. 3 is a front view of the in-vehicle camera unit according to the first embodiment of the present invention.
Figure 4:
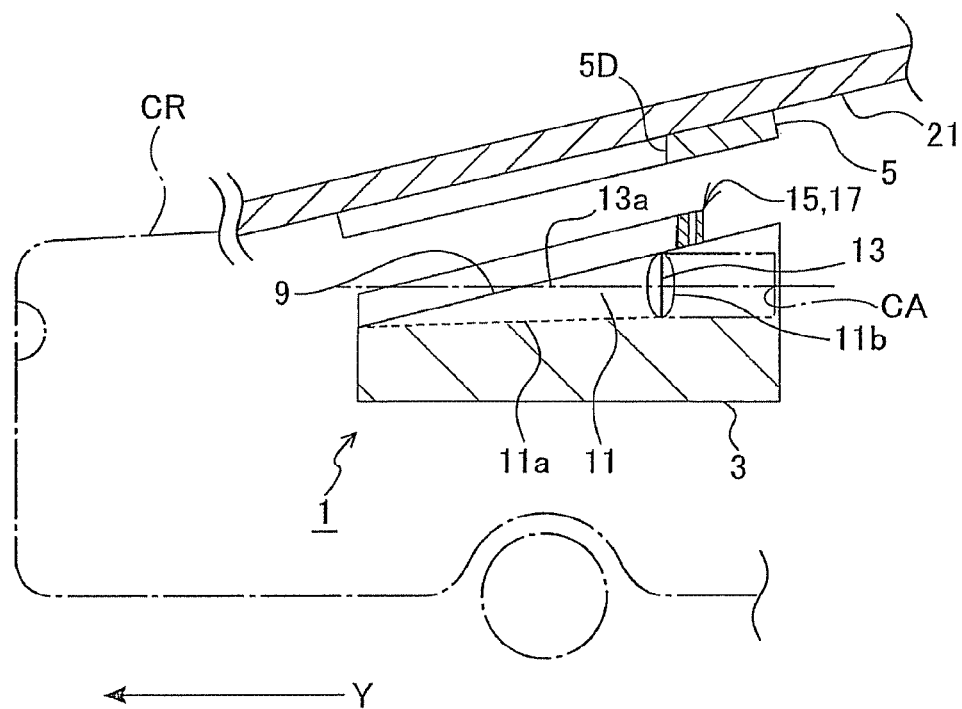
FIG. 4 is a cross sectional side view taken from line IV-IV of FIG. 2.
Figure 5A:
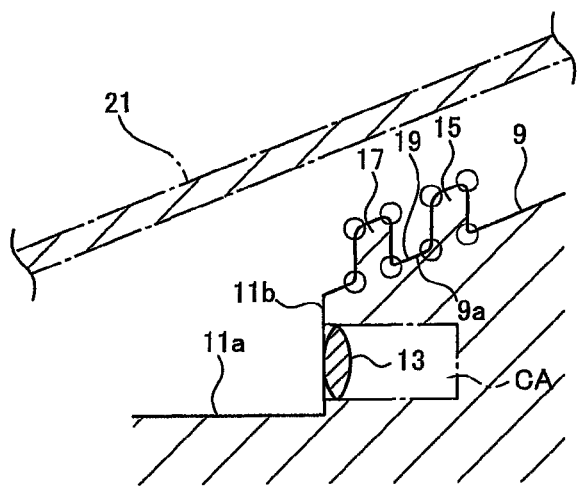
FIG. 5A to FIG. 5D are cross-section views taken from line V-V of FIG. 1, which show prevention members and the periphery of them.

A first embodiment will be described with reference to FIG. 1 to FIG. 5A. FIG. 1 is a perspective view of a main portion 3 of an in-vehicle camera unit 1. The main portion 3 is described below. FIG. 2 is a top view of the in-vehicle camera unit 1. FIG. 3 is a front view of the in-vehicle camera unit 1. FIG. 4 is a cross sectional side view taken from line IV-IV of FIG. 2. FIG. 5A is a cross-section view taken from line V-V which shows prevention members 15, 17 and the periphery of them. The prevention members 15, 17 are described below.

The in-vehicle camera unit 1 has a main portion 3 and bracket 5. As shown in FIG. 1, the main portion 3 has a body 7 and compositions (not shown in figures) of camera CA which are publicly known. The compositions including lens 13 are accommodated in the body 7. The in-vehicle camera unit 1 of this embodiment is attached to a car, with the lens 13 facing the windshield 21 of the car. The windshield 21 slopes forward and downward. The forward direction of the car is indicated by the arrow Y in FIG. 4. The body 7 has a top surface 9 (corresponding to a "first surface" in the claims) sloping along the windshield 21. With respect to the lens 13, the top surface 9 is oblique in such a way as to be away from the optical axis 13a of the lens 13 with increasing distance from the lens 13 backward of the lens 13. The front-back direction along the top surface 9 is described bellow as the oblique direction C. Thus, by forming the top surface 9 in the same shape as the windshield 21, the in-vehicle camera unit 1 can be stably attached close to the windshield 21.

The recess 11 is formed in the top surface 9. The recess 11 continues to the front end of the top surface 9. The side surfaces 11b, 11c, 11d of the recess 11 are exposed to the front side. The inside bottom 11a of the recess 11 has a lower pitch than the rest portion of the top surface 9 except the recess 11. The lens 13 is attached to the lens attached surface 11b which is the side surface facing forward, so lens 13 is exposed and facing forward. The recess 11 is a space to assure angle of view of the camera.

Two prevention members 15, 17 are provided at the top surface 9. The prevention members 15, 17 surround three directions of the recess 11 except the front direction. That is, the prevention members 15, 17 extend across the oblique direction C on an oblique portion 9a which is a portion of the top surface and positioned backward from the recess 11 (in other words, the oblique portion is the portion which has a rising pitch along the oblique direction C from the lens 13). Further, in this embodiment, the prevention members 15, 17 extend along the periphery of the recess 11 from there to the front end of the top surface 9. In this way the prevention members 15, 17 guide water drops fallen from the windshield 21 to a position where the guided water drops do not hinder the field angle of the camera.

Portions on the oblique portion 9a of the prevention members 15, 17 are made in a nearly V-shape opening to the lens 13 as viewed from the front of the top surface 9. The bend portion 15a, 17a of this V-shaped portion (which is in the middle of the prevention members 15, 17 and facing backward of the oblique direction) is treated with round chamfering, and rounded.

FIG. 5A is cross-section view taken from line V-V of FIG. 2, which shows the prevention members 15, 17 and the periphery of them. Each of the prevention members 15, 17 is a dike (or a protrusion) formed on the top surface 9, and each dike's top is one revel higher than the main of the top surface 9. Thus, the prevention members 15, 17 form a structure bearing two dikes provided along the oblique direction. The prevention members 15, 17 have the same cross-section shape in any portion.

The edges of the prevention members 15,17 are rounded by round chamfering, as the edges are circled in FIG. 5A. The crooked portion in the top and base of the dike has curved surface. The prevention members 15, 17 of this embodiment are provided at some interval 19 where there is not a dike, trench and so on, and which is a flat surface.

The main portion 3 of the in-vehicle camera unit 1 is attached to the windshield 21 by using a bracket 5. The bracket 5, in FIG. 2 to FIG. 4, has a flat plate-like attachment portion 5A and a pair of holding portions 5B, 5B. The plate-like holding portions 5B, 5B respectively hang down from both ends of the attachment portion 5A. The bracket 5, in FIG. 3, holds the main portion 3 such that the both side surface of the main portion 3 are respectively fixed to holding portions 5B, 5B. The bracket 5 is attached to the windshield 21 by bonding the top surface of the attachment portion 5A.

In a state where the in-vehicle camera unit 1 is attached to the windshield 21 through the bracket 5, the lens 13 of the in-vehicle camera unit 1 is directed forward of the vehicle, and the top surface 9 slopes forward and downward. In this state, as shown in FIG. 3, the attachment portion 5A of the bracket 5 and the top surface of the main portion 3 face each other, keeping predetermined distance X between each other. The top surfaces 9 of the main portion 3 faces the windshield 21, sandwiching the attachment portion 5A between them. Keeping the predetermined distance X can prevent dew drops from flowing down the bracket 5 to the lens 13.

A cutout portion 5D of the bracket 5, in FIG. 2, is formed by cutting out a portion of the attachment portion 5A facing the recess 11. This structure prevents the bracket 5 hindering the angle of view of the in-vehicle camera unit 1. A portion of the attachment portion 5A facing the prevention members 15, 17 may be cut out. This structure can prevent dew drops which have adhered to the bracket 5 from falling on the lens 13.

For example, the body 7 and the prevention member 15, 17 may be made from metal materials by die-casting.

2. Effects of the In-vehicle Unit 1 According to this Embodiment (1) The windshield 21 and the attachment portion 5A of the bracket 5 face the top surface 9 of the in-vehicle camera unit 1. The dew drops on the inside surface of the windshield 21 may fall on the top surface 9 directly or through the attachment portion 5A. As dew drops fall on the oblique portion 9a which is a portion of the top surface 9 positioned backward from the lens 13, the dew drops are inclines to flow down to the lens 13 because the top surface 9 slopes forward and downward.

In this case, the in-vehicle camera unit 1 can prevent the dew drop from adhering to the lens 13 by the prevention members 15, 17 provided to surround the recess 11 where the lens 13 is attached.

(2) The prevention members 15, 17 form a structure which bearing two dikes provided along the oblique direction. Thus the effect of the prevention of water drops is further increased.

Further these structures enable to prevent water drops from falling without making a projection of a dike or a step higher too much. The effect of the prevention of water drops is increased by making the top surface of the projection to slope.

(3) The prevention members 15, 17 is made in nearly V-shape opening to the lens 13. This structure can change the direction of the water drops that have flowed down the oblique portion 9a toward left or right, so it prevents the water drops from adhering to the lens 13.

(4) The prevention members 15, 17 are provided at interval. Thus the effect of the prevention of water drops is further increased. This structure can extend lifetime of a mold or die as the body 7 is made by using the mold or die.

(5) Each of the edges of the prevention members 15, 17 is treated with round chamfering to be rounded. The bend portion 15a, 17a are also treated with round chamfering, and rounded. These structure enable water drops to spread on the top surface 9 and change from a mass which easily fall into a state which hardly fall, so it prevent the water drops from falling on the lens 13. Thus the effect of preventing water drops from adhering to the lens 13 is further increased.

(6) It is easy to attach the in-vehicle camera unit 1 having the bracket 5 to a vehicle.

3. A Test for Confirming the Effect of the In-vehicle Camera Unit 1

In FIG. 3, water drops were chopped on 3 points P, Q, R in the main portion 3, and the flows of the water drops were observed. As a result, in any cases it was confirmed that water drops had been prevented from reaching the recess by the prevention members 15, 17.

On the other hand, the same tests as described above were performed, using a main portion which basically had the same structure as the main portion 3 of this embodiment but didn't have prevention members 15, 17. As a result, it was observed that water chops had reached the recess and had adhered to the lens 13.

(Other Embodiments)

Other embodiments will be described with reference to FIG. 5B to FIG. 5D.

The present invention is not limited to the above-described embodiments. Modifications can be made accordingly without departing from the scope of the present invention.

Figure 5B:
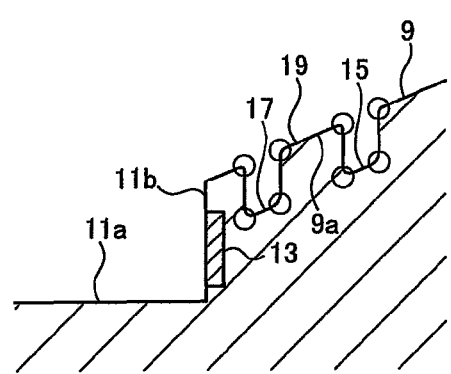
Figure 5C:
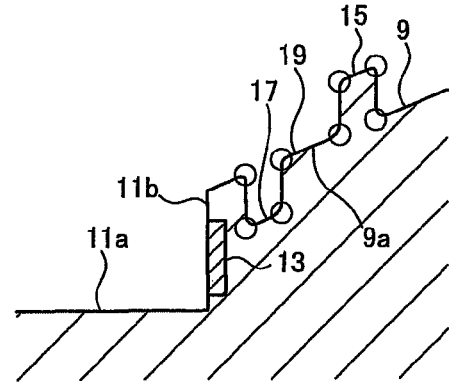

For example, in FIG. 5B, trenches the bottoms of which are lower than the top face 9 may be made as prevention members 15, 17. In FIG. 5C the prevention member 15 may be the dike, and the prevention member 17 may be the trench. Alternatively, the prevention member 17 may be the dike, and the prevention member 15 may be the trench.

Figure 5D:
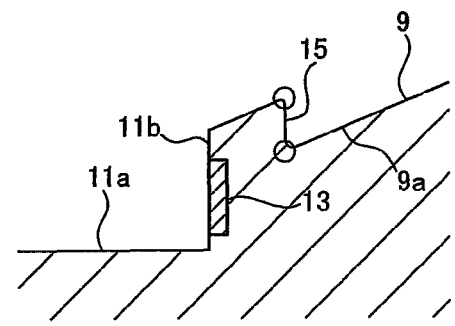
Figure 6:
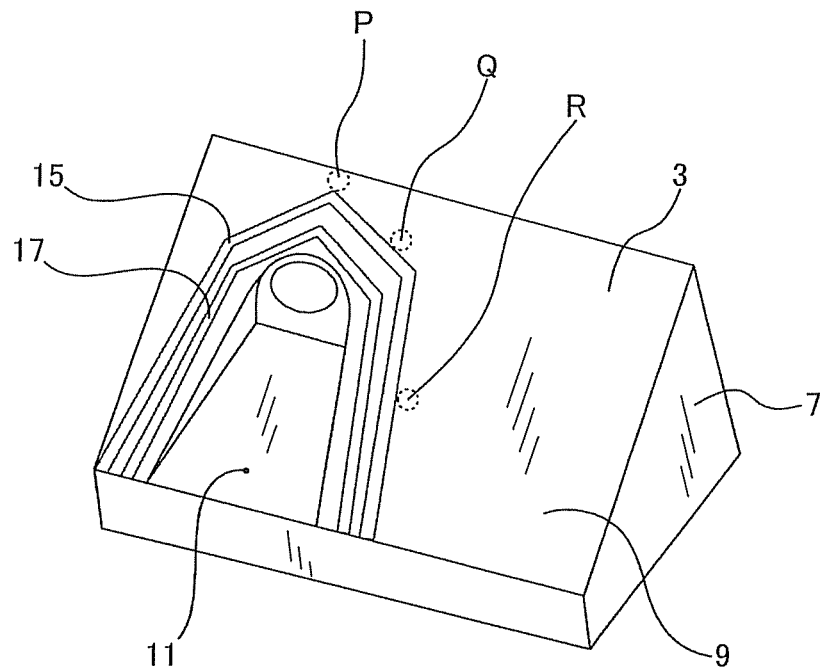
FIG. 6 is a perspective view of the in-vehicle camera unit which shows the method of the test for effect confirmation of the in-vehicle camera unit.

In FIG. 5D a step the top surface of which is higher than the top surface 9 may be made as a prevention member 15.

The number of prevention members is not limited to 2. For example, only a prevention member may be provided, and 3,4,5 or more prevention members may be provided.

The prevention members 15, 17 may have right-angled edges without round chamfering.

As viewed from the front of the top surface 9, the shapes of the prevention members 15, 17 are not limited to V-shapes, but other shapes are allowed. For example, the prevention members 15, 17 may be formed in a U-shape opening to the lens 13, as viewed from the front of the top surface 9.

The prevention members 15, 17 are not limited to the structure which has the interval between each other, and a structure which has no interval may be allowed. For example, by piling the prevention member on top of another, the prevention members 15, 17 may be formed in stair-like shapes.

The bracket 5 may be attached to an inside of a roof or to a place astride an inside of a roof and the windshield 21. The in-vehicle camera unit 1 may be attached to a back window or the periphery of the back window, and take an image of backward of a vehicle. In that case, the direction of the in-vehicle camera unit is opposite to the one of the in-vehicle camera unit for taking an image of front of a vehicle. Alternatively, the in-vehicle camera unit 1 may be attached to a side window or the periphery of the side window, and take an image of side of a vehicle. In that case, the direction of the in-vehicle camera unit is set by rotating the direction of the in-vehicle camera unit for taking an image of front of a vehicle approximately 90 degree.

The prevention members 15, 17 do not have to surround all three direction of the recess 11. For example, they may be provided only in the area of the oblique portion 9*a* which can cover the width of the recess 11 (or the lens 13).

What is claimed is:

1. An in-vehicle camera unit comprising:
   a body to which a lens is attached; and
   a prevention member that prevents water drops from falling on the lens, wherein
   the body has a first surface where the lens is arranged, a front surface of the lens being exposed to an outside of the body;
   the first surface has an oblique portion extending from the periphery of the lens backward of the lens, the oblique portion being oblique in such a way as to be away from the optical axis of the lens with increasing distance from the lens backward; and
   the prevention member is provided in or on the oblique portion across an oblique direction of the oblique portion.

2. The in-vehicle camera unit according to claim 1, wherein
   the first surface has a recess;
   the lens is arranged in the recess such that the first surface is oblique to the optical axis of the lens and the oblique portion is positioned backward from the recess; and
   the recess has a space for assuring an angle of view of the in-vehicle camera unit.

3. The in-vehicle camera unit according to claim 2, wherein the prevention member is formed to surround the periphery of the recess.

4. The in-vehicle camera unit according to claim 1, wherein the body is attached to the vehicle such that the first surface faces a windshield of the vehicle.

5. The in-vehicle camera unit according to claim 1, wherein the prevention member is a member selected from a group consisting of a protrusion, a trench, and a step each extending across the oblique direction.

6. The in-vehicle camera unit according to claim 5, wherein the member selected from the group has a rounded edge.

7. The in-vehicle camera unit according to claim 1,
   further comprising a bracket that has an attachment portion attached to a windshield of the vehicle and which holds the body,
   wherein the body is held such that the first surface faces the attachment portion.

8. The in-vehicle camera unit according to claim 1, wherein a plurality of prevention members are provided along the oblique direction.

9. The in-vehicle camera unit according to claim 8, wherein the plurality of prevention members are provided at intervals in the oblique direction.

10. The in-vehicle camera unit according to claim 5, wherein
    the prevention member provided in or on the oblique portion has a projection projected from the first surface, and
    the protection has a top surface which is oblique to be away from the optical axis of the lens with increasing distance from the lens backward the lens.

11. The in-vehicle camera unit according to claim 1, wherein
    the prevention member is formed to be close to the lens along the oblique direction as the distance increasing from the optical axis of the lens along a direction crossing the oblique direction.

12. The in-vehicle camera unit according to claim 1, wherein
    the prevention member is formed in an approximately V-shape which opens toward the lens as being viewed from the front of the first surface.

* * * * *

UNITED STATES PATENT AND TRADEMARK OFFICE
CERTIFICATE OF CORRECTION

PATENT NO. : 8,548,315 B2  
APPLICATION NO. : 13/331339  
DATED : October 1, 2013  
INVENTOR(S) : Syo Okuda Page 1 of 1

It is certified that error appears in the above-identified patent and that said Letters Patent is hereby corrected as shown below:

In the Claims

Column 6, line 25, Claim 10 "protection" should be -- projection --.

Signed and Sealed this  
Twenty-fifth Day of February, 2014

Michelle K. Lee  
*Deputy Director of the United States Patent and Trademark Office*